US012358029B2

(12) United States Patent
Daniels

(10) Patent No.: US 12,358,029 B2
(45) Date of Patent: Jul. 15, 2025

(54) PACIFIER CLEANING AND STORAGE APPARATUS

(71) Applicant: Terry Daniels, Torrance, CA (US)

(72) Inventor: Terry Daniels, Torrance, CA (US)

( * ) Notice: Subject to any disclaimer, the term of this patent is extended or adjusted under 35 U.S.C. 154(b) by 9 days.

(21) Appl. No.: 17/950,290

(22) Filed: Sep. 22, 2022

(65) Prior Publication Data

US 2024/0100574 A1 Mar. 28, 2024

(51) Int. Cl.
*B08B 3/04* (2006.01)
*A61J 17/00* (2006.01)

(52) U.S. Cl.
CPC ............ *B08B 3/044* (2013.01); *A61J 17/001* (2015.05); *A61J 17/109* (2020.05); *A61J 17/113* (2020.05)

(58) Field of Classification Search
CPC ................................................ B08B 3/044
See application file for complete search history.

(56) References Cited

U.S. PATENT DOCUMENTS

| | | | |
|---|---|---|---|
| 5,298,077 | A | 3/1994 | Saarela et al. |
| 5,402,810 | A | 4/1995 | Donley |
| 6,343,612 | B1 | 2/2002 | Dahl |
| 6,708,363 | B2 | 3/2004 | Larsen |
| 7,207,342 | B1 | 4/2007 | Daniels |
| 8,568,658 | B1 | 10/2013 | Malka |
| 8,671,491 | B1 | 3/2014 | Pijor et al. |
| 9,662,192 | B2 | 5/2017 | Chastain |
| 10,052,263 | B2 | 8/2018 | Baina |

*Primary Examiner* — Jason Y Ko
(74) *Attorney, Agent, or Firm* — Next IP Law Group

(57) ABSTRACT

A pacifier cleaning and storing apparatus is disclosed to have three main elements: an upper section, a center section and a lower section. Within the upper section is a pump with a water inlet and an adjustable spray nozzle. Within the lower section is an internal support member that is located at the substantial midpoint of the lower section. The apparatus can be opened, and a pacifier can be placed on the internal support member. Clean water is put into the center section, and when a resilient member on the upper sections is squeezed and downward pressure is applied, the water is forced through the inlet into the pump. The water is then sprayed, onto the pacifier. Once the pacifier has been cleaned, it can be removed, or remain within the apparatus.

18 Claims, 5 Drawing Sheets

PACIFIER CLEANING AND STORAGE APPARATUS

TECHNICAL FIELD

The invention generally pertains to child products and more particularly to an apparatus that allows a pacifier (or other oral hygiene items) to be quickly and easily cleaned and then be stored in a secure, enclosed location or removed for use.

BACKGROUND ART

Throughout the world, babies are born every day. As babies grow as children from infants to toddlers they go through various phases. One of these phases is known as the oral phase when a child likes to place items in his/her mouth and/or suck on their thumb. One item that is used to attempt to remedy this behavior is a pacifier. A typical pacifier, or binky, as they are also known is a simple soft material bulbous member with a guard that prevents the entire pacifier from being placed in the mouth. A child will then suck on the pacifier which comforts/relaxes the child.

Due to the nature of a pacifier's function and design, a pacifier spends its useful life in a child's mouth. Because of this it is extremely important that a pacifier is clean prior to use. Usually, a pacifier is washed in a sink or a dishwasher, often along with other items such as kitchen utensils. While this is a method for cleaning a pacifier it is not optimal for multiple reasons.

It would be very beneficial if there was some method or device/apparatus that was exclusively used to clean a pacifier, with no chance of contamination from exposure to other items or being in an exposed area.

By providing a dedicated pacifier cleaning apparatus (which could potentially be used to clean other oral hygiene products) a parent or guardian could be assured that precaution has been taken to prevent a child from using a dirty contaminated pacifier. An additional benefit would be if, after a pacifier is cleaned, the pacifier can be stored in a completely enclosed space, thereby guaranteeing the pacifier remains clean until it is needed for use.

A search of the prior art did not disclose any literature or patents that read directly on the claims of the instant invention. However, the following U.S. patents are considered related:

| PAT. NO. | INVENTOR | ISSUED |
|---|---|---|
| 5,402,810 | Donley | Apr. 4, 1995 |
| 6,343,612 | Dahl | Feb. 5, 2002 |
| 6,708,363 | Larsen | Mar. 23, 2004 |

The U.S. Pat. No. 5,402,810 patent discloses a portable apparatus for storing and cleaning pacifiers, including a vessel having a vessel opening for cleaning fluid, a pacifier storage and cleaner rack comprising a raised platform sized to fit within the vessel, the platform having opening for permitting the passage of the cleaning fluid through the platform and alternatively with a through-hole with a diameter sized smaller than the pacifier's base. The apparatus includes a vessel lid having an outer lid connected to a support member. The apparatus also preferably includes a lid engaging mechanism for removably securing the lid over the vessel opening.

The U.S. Pat. No. 6,343,612 patent discloses an apparatus for cleaning and storing pacifiers, comprising a cylindrical body containing two compartments. The first compartment is for cleaning a pacifier and has a lid. The lid contains a channel for a strap which is used to attach the apparatus to a baby stroller or other location. The second compartment has a snap-on lid for the transportation of a spare pacifier.

The U.S. Pat. No. 6,708,363 patent discloses a pacifier cleaner that includes a container and a pacifier cleaner insert in the container. The container encloses the pacifier while also holding a liquid for cleaning the pacifier. The insert cleans the nipple and the inside surface of the pacifier base while wet with a cleaning liquid distributed in the container.

For background purposes and indicative of the art to which the invention relates, reference may be made to the following remaining patents found in the patent search.

| PAT. NO. | INVENTOR | ISSUED |
|---|---|---|
| 5,298,077 | Saarela, et al | Mar. 29, 1994 |
| 7,207,342 | Daniels | Apr. 24, 2007 |
| 8,568,658 | Malka | Oct. 29, 2013 |
| 8,671,491 | Pijor, et al | Mar. 18, 2014 |
| 9,662,192 | Chastain | May 30, 2017 |
| 10,052,263 | Baina | Aug. 21, 2018 |

DISCLOSURE OF THE INVENTION

A pacifier cleaning and storing apparatus is disclosed in two design configurations. Both design configurations have three main elements. In the first design configuration, the three elements are an upper section, a center section and a lower section. Within the upper section is a pump with a water inlet and an adjustable spray nozzle. Within the lower section is an internal support member that is located at the substantial midpoint of the lower section. The apparatus can be opened, and a pacifier can be placed on the internal support member in the lower section. Clean water is put into the center section. When are resilient member on the upper section is squeezed and downward pressure is applied, the pressure forces the water through the water inlet into the pump. From the pump, the water is sprayed out, onto the pacifier resting on the support member. Once the pacifier has been cleaned, the pacifier can be removed for immediate use, or the pacifier can remain stored within the apparatus. With the pacifier removed from the apparatus, dirty water that has collected below the support member within the lower section can be emptied from the lower section.

The second design configuration of the pacifier cleaning and storing apparatus is functionally the same as the first design and also has three major elements. The difference between the second design and the first design is the second design has an appearance of a stylized bear. Instead of an upper section, the second design has a hat section, the center section is replaced with a head section including eyes, a nose and ears, and the lower section becomes a body section with two arms and two feet. This stylized bear appearance adds to the aesthetics of the apparatus and presents a fun, non-threatening image for a young child. It is important to note, the stylized bear appearance is just one of many "animals" (stylized or not) that can be used. The apparatus could easily be modified to have the appearance of a rabbit, a dog, a cat or almost any type of animal. The bear was chosen just as an example and to provide a source of reference.

Other than the appearance, the second design functions the same as the first design. The hat section has a resilient section that, when squeezed, actuates an internal pump to spray clean water onto a pacifier that is resting upon a support member with the body section. After cleaning, the pacifier is removed and the dirty water at the bottom of the body section can be removed.

While the apparatus is primarily designed for use with a pacifier, it is also possible to use the apparatus to clean and store other oral hygiene products such as a toothbrush or comb, or even non-oral hygiene products such as eating or cooking utensils.

It should be noted that the functionality of the apparatus extends beyond the limited use for a pacifier exclusively. Also, to increase the cleanliness, the apparatus can have an anti-microbial coating applied.

In view of the above disclosure, the primary object of the invention is to produce a pacifier cleaning and storing apparatus that provides a user with the one or more pacifiers in a dedicated apparatus without any danger of contamination occurring from cleaning a pacifier at the same time along with other items.

In addition to the primary object, it is also an object of the invention to produce a pacifier cleaning and storing apparatus that:

is easy to use,
can be used to clean various types and sizes of pacifiers,
can be made in various colors to match a color scheme,
can be sold alone or along with one or more pacifiers,
can be easily cleaned itself,
is robust and long-lasting,
can include indicia such as advertising,
is portable/easy to transport,
does not require external power, and
is cost effective from both a manufacturer's and consumer's point of view.

These and other objects and advantages of the present invention will become apparent from the subsequent detailed description of the preferred embodiment and the appended claims taken in conjunction with the accompanying drawings.

BRIEF DESCRIPTION OF THE DRAWINGS

FIG. 3 is a front elevational view of the pacifier cleaning and storing apparatus second design configuration.

BEST MODE FOR CARRYING OUT THE INVENTION

The best mode for carrying out the invention is presented in terms that disclose a preferred embodiment with two design configurations of a pacifier cleaning and storing apparatus (PCSA). For many infants and toddlers, one of the most important items in their lives is a pacifier. Due to the nature of its function, when in use, a pacifier is located within an infant's/toddler's mouth. As a result, it is extremely important that a pacifier is clean prior to use. Typically, a pacifier is simply cleaned in a sink, often along with other household/kitchen items. This is not optimal, and what is needed is a dedicated cleaning device that is used only for a pacifier(s). This would reduce the likelihood of contamination from a pacifier being in close proximity to other items that are being cleaned. The PCSA offers a solution to this problem by providing an apparatus into which a pacifier can be placed, fully enclosed, and cleaned. After cleaning, a pacifier can be removed for immediate use, or the pacifier can remain in the apparatus for use when required.

Figure 1:
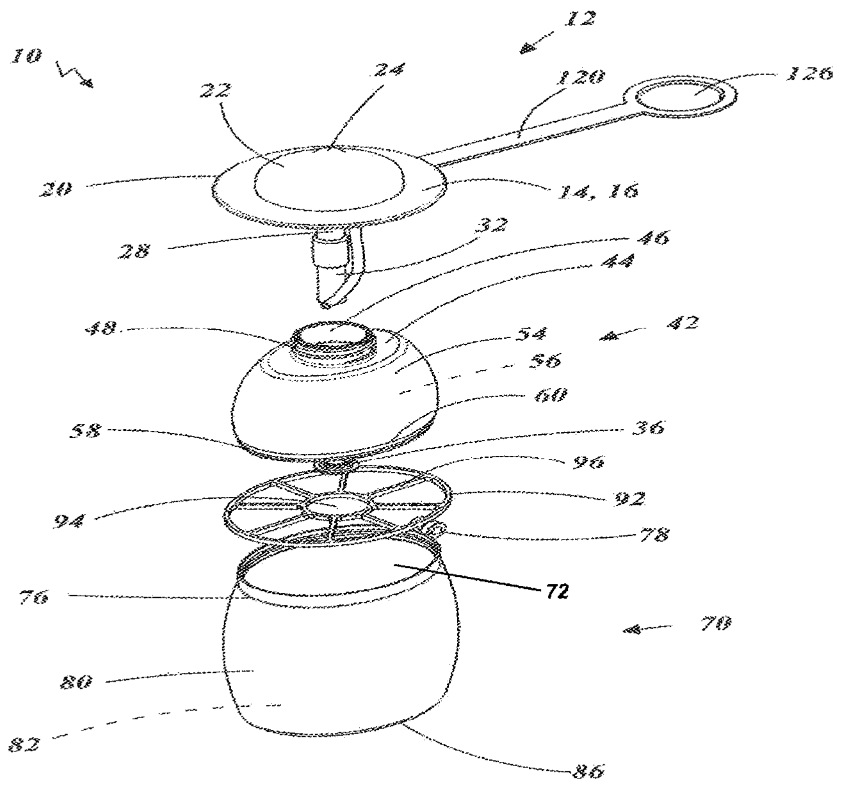
FIG. 1 is an orthographic exploded view of a pacifier cleaning and storing apparatus first design configuration.
Figure 2:
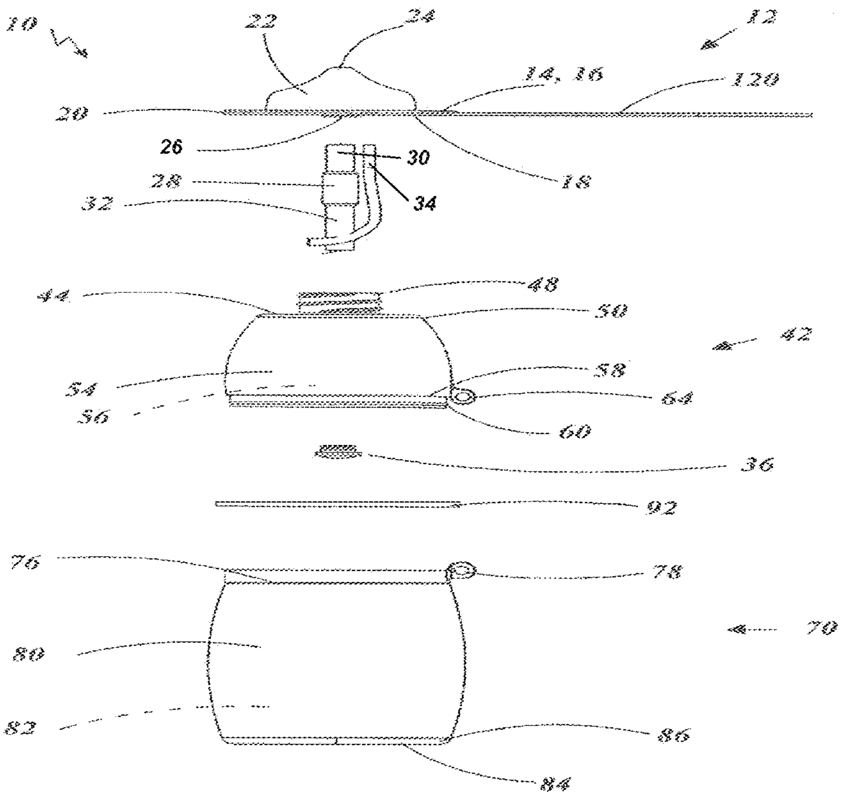
FIG. 2 is an elevational exploded view of the pacifier cleaning and storing is apparatus first design configuration.

The first design configuration of the PCSA 10, as shown in FIGS. 1-2, is a basic design with a generic appearance. The first design configuration 10 is comprised of an upper section 12 comprising a base 14 having an upper surface 16, a lower surface 18, and a perimeter edge 20.

The base 14 can be any shape, with circular preferred. Expanding upward from the base upper surface 16 is a resilient member 22 with an upper tip 24. On the base lower surface 18 is a threaded opening 26. Extending outward from the base perimeter edge 20 is a securing member 120 with an inner end and an outer end having a ring 126. Extending downward from the base lower surface 18 is a pump 28 having an upper end 30, a lower end 32, a water inlet 34 and an adjustable spray nozzle 36 located at the pump's lower end 32.

Directly below the upper section 12 is a center section 42 comprising an upper surface 44 having an opening 46. A threaded member 48 corresponds to the threaded opening 26 on the base, and an upper perimeter edge 50 extends around the upper surface 44. Also, on the center section 42 is an outer surface, an inner surface 56, a lower perimeter edge 58, a lower interface 60, a lower opening and a hinged tab 64.

Below the center section 42 is a lower section 70 comprising an upper opening 72, an upper interface 74 that corresponds to the lower interface 60 on the center section 42. The two interfaces 60,74 maintain the center section 42 secured to the lower section 70. Extending around the upper opening 72 is an upper perimeter edge 76. A hinge slot 78 is located on an outer surface 80 and is mated to the hinge tab 64 on the center section 42. The lower section 70 also comprises an inner surface 82, a lower surface 84 and a lower perimeter edger 86, as shown in FIGS. 1-2. Located within the lower section 70 at the substantial midpoint is an internal support member 92 having a center opening 94 and at least two spokes 96, thereby creating a grill-like structure, as shown in FIG. 1.

The second design configuration of the PCSA 100, as shown in FIGS. 3-6, is functionally the same as the first design configuration except the second design has the appearance of a stylized bear 102, wich is appealing to young children and adds to the aesthetic look of the PCSA 100. The second design configuration 100, as a stylized bear 102, as best shown in FIG. 3, comprises a hat section 104 with a base 106 having an upper surface 108, a lower surface 110, and a perimeter edge 112. Extending upward from the base 106 is a resilient member 114 with an upper tip 116 which appears as the top of the hat. Extending outward from the hat base perimeter edge 112 is a securing member 120 with an inner end 122 and an outer end 124 having a ring 126. On the base lower surface 110 is a threaded opening 130. Extending downward from the base 106 is a pump 138 having an upper end 134, a lower end 136, a water inlet 138, and an adjustable spray nozzle 140 on the lower end 136.

As shown in FIG. 3, below the hat section 104 is a head section 146 comprising an upper surface 148 having an opening 150, a threaded member 152 that corresponds to the threaded opening 130 on the base 106 and an upper perimeter edge 154. The head section 146 also has an outer surface 156, a lower surface 158, and, to add to the appearance of a bear, a face 160 with two eyes 162, a nose 164, and two ears 166. At the bottom of the head is a lower perimeter edge 170, a lower interface 172, a lower opening 174 and a hinge tab 176.

Below the head section 146 is a body section 180 comprising an upper opening, an upper interface 184 that corresponds to the lower interface 172 on the head section 146, and an upper perimeter edge 186. A hinge slot 188 is mated to the hinge tab 176 on the head section 146. The body section 180 also comprises an outer surface 190, an inner surface 192, a lower surface 196 and a lower perimeter edge 194. To add to the bear appearance, the body section 180 has two arms 200 and two feet 202.

Figure 4:
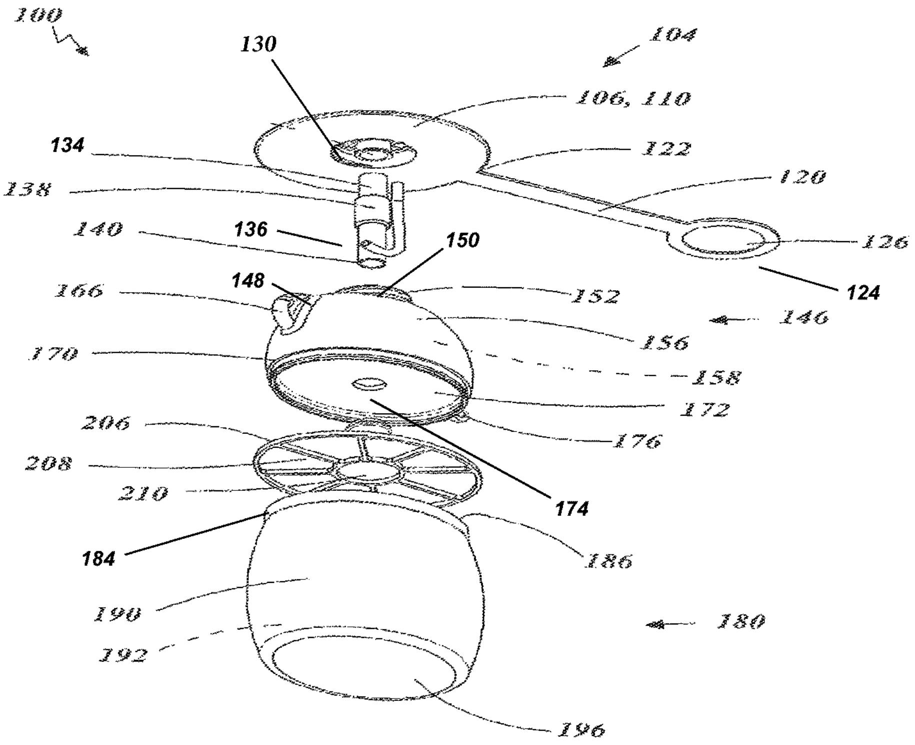
FIG. 4 is an exploded view of the pacifier cleaning and storing apparatus second design configuration.
Figure 5:
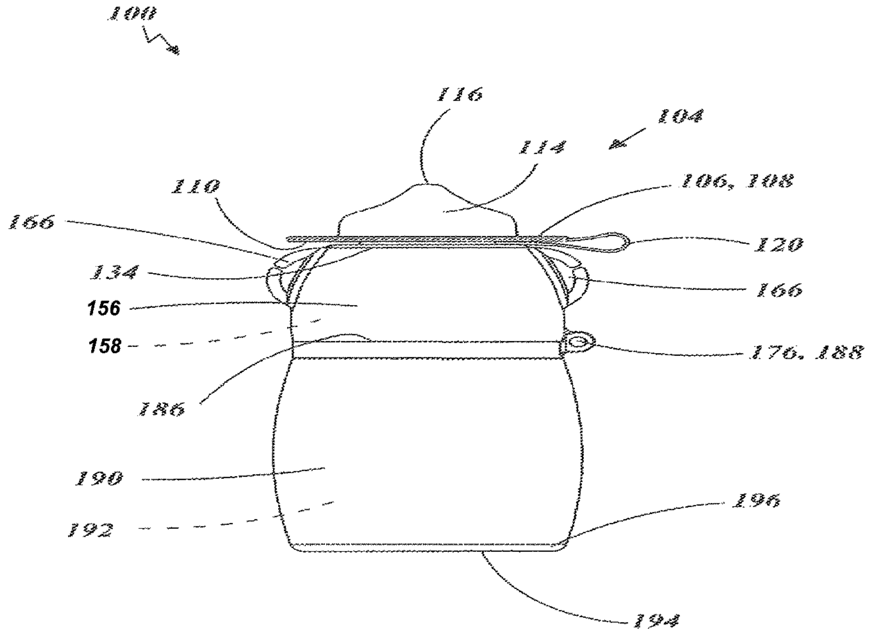
FIG. 5 is an elevational rear view of the pacifier cleaning and storing apparatus second design configuration.

Located within the body section 180 at the substantial midpoint of the section is an internal support member 206 having a center opening 208 and at least two spokes 210, thereby creating a grill-like structure, as shown in FIG. 4.

For both design configurations, the upper section/hat section, center section/head section or lower section/body section can be made of various materials including plastic, rubber or a composite material, with plastic preferred. The different components of the PCSA 10 can also be made of multiple different materials.

Figure 6:
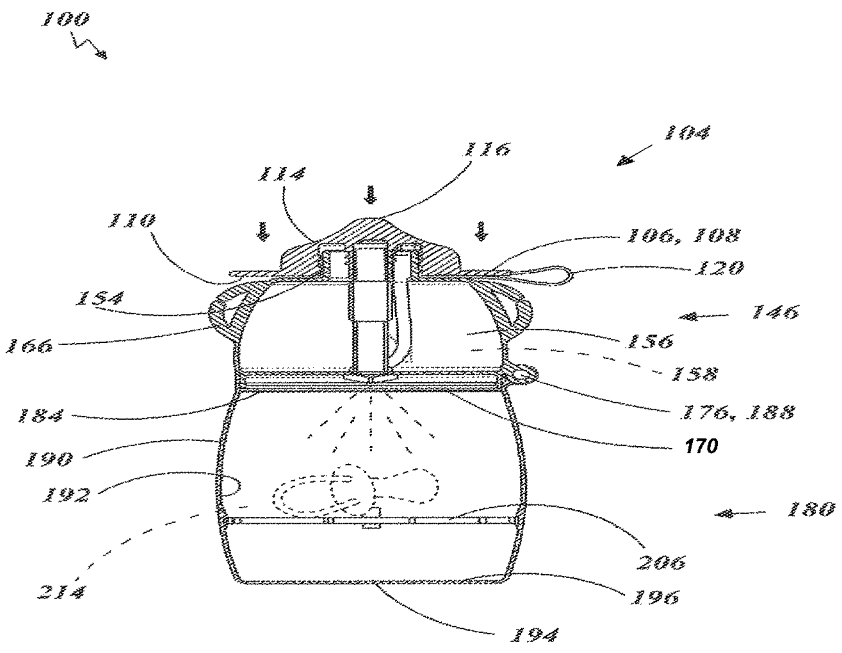
FIG. 6 is an elevational rear view with internal view of the pacifier cleaning and storing apparatus second design configuration.

To use the PCSA 10 the upper/hat section is un-screwed and removed from the center/head section. Clean water is then inserted into the center/head section. A pacifier 214 is placed into the lower/body section via the lower/body section upper opening, and the pacifier 214 rests upon the internal support member 206. Water within the center/head section flows through the water inlet into the pump. From there, when the resilient member on the upper/hat section is squeezed, the applied pressure causes the water to be forced out of the adjustable spray nozzle and onto the pacifier 214, as shown in FIG. 6. After the water is sprayed onto the pacifier, and the pacifier is clean, the pacifier is ready for use, or the pacifier can be stored within the PCSA. When the pacifier is removed, the dirty water that has collected at the bottom of the lower/body section, beneath the support member, is removed from the PCSA.

It should be noted that while the PCSA 10 is primarily for use with a pacifier, any oral hygiene products can be placed within either a conventional or modified PCSA 10. The ability to spray clean water on an item, in an enclosed environment, can be applied for use with many items such as a toothbrush or a comb. Also, if desired, multiple pacifiers (or other items) can be placed into the PCSA 10, as long as the size of the PCSA permits it.

While the invention has been described in detail and pictorially shown in the accompanying drawings it is not to be limited to such details, since many changes and modifications may be made to the invention without departing from the spirit and the scope thereof. Hence, it is described to cover any and all modifications and forms which may become within the language and scope of the claims.

The invention claimed is:

1. A pacifier cleaning and storing apparatus (PCSA) comprising:
- an upper section comprising a base having:
  - an upper surface,
  - a lower surface,
  - a perimeter edge,
  - a resilient member with an upper tip, the resilient member extending upward from the base upper surface,
  - a threaded opening on the base lower surface,
  - a pump having an upper end, a lower end a water inlet and an adjustable spray nozzle on the lower end, the pump extending downward from the base lower surface,
- a center section comprising:
  - an upper surface having:
    - an opening,
    - a threaded member that correspond to the threaded opening on the base,
    - an upper perimeter edge,
    - an outer surface,
    - an inner surface,
    - a lower perimeter edge,
    - a lower interface,
    - a lower opening,
    - a hinge tab,
  - a lower section comprising:
    - an upper opening,
    - an upper interface that corresponds to the lower interface on the center section,
    - an upper perimeter edge,
    - a hinge slot that is mated to the hinge tab on the center section,
    - an outer surface,
    - an inner surface,
    - a lower surface,
    - a lower perimeter edge, and
  - an internal support member having a center opening and at least two spokes, the support member located within the lower section at a substantial midpoint of the section.

2. The pacifier cleaning and storing apparatus of claim 1, wherein the upper section, center section and lower section are made of plastic.

3. The pacifier cleaning and storing apparatus of claim 1, wherein the upper section, center section and lower section are made of rubber.

4. The pacifier cleaning and storing apparatus of claim 1, wherein the upper section center section and lower section are made of a composite material.

5. The pacifier cleaning and storing apparatus of claim 1, wherein when the upper section is un-screwed and removed from the center section, clean water is inserted into the center section.

6. The pacifier cleaning and storing apparatus of claim 1, wherein a pacifier is placed into the lower section via the lower section upper opening and rests upon the internal support member.

7. The pacifier cleaning and storing apparatus of claim 1, wherein water within the center section flows through the water inlet into the pump, and then when squeeze pressure is applied to the upper section resilient member, the water is forced out of the adjustable spray nozzle and onto the pacifier.

8. The pacifier cleaning and storing apparatus of claim 1, wherein after water is sprayed onto a pacifier, the pacifier is removed from the lower section by separating the center section from the lower section.

9. A pacifier cleaning and storing apparatus (PCSA) with the appearance of a stylized bear, the PCSA comprising:
- a hat comprising:
  - a base having:
    - an upper surface, a lower surface,
a perimeter edge,
a resilient member with an upper tip,
a securing member with an inner end and an outer end having a ring, the securing member extending outward from the hat base perimeter edge,
a threaded opening on the base lower surface,
a pump having an upper end and an adjustable spray nozzle, the pup extending downward from the base lower surface,
a head section comprising:
an upper surface having:
an opening,
a threaded member that corresponds to the threaded opening on the base,
an outer surface,
an inner surface,
a face on the outer surface, the face having two eyes, a nose and two ears,
a lower perimeter edge,
a lower interface,
a lower opening,
a hinge tab,
a body section comprising:
an upper opening,
an upper interface that corresponds to the lower interface on the head section,
an upper perimeter edge,
a hinge slot that is mated to the hinge tab on the head section,
an outer surface,
an inner surface,
a lower surface,
a lower perimeter edge,
two arms,
two feet, and
an internal support member having a center opening and at least two spokes, the support member located within the body section at a substantial midpoint of the section.

10. The pacifier cleaning and storing apparatus of claim 9, wherein the hat section, the head section and the body section are made of plastic.

11. The pacifier cleaning and storing apparatus of claim 9, wherein the hat section, the head section and the body section are made of rubber.

12. The pacifier cleaning and storing apparatus of claim 9, wherein the hat section, the head section and the body section are made of a composite material.

13. The pacifier cleaning and storing apparatus of claim 9, wherein the hat section, the head section and the body section are made of a combination of multiple different materials.

14. The pacifier cleaning and storing apparatus of claim 9, wherein when the hat section is un-screwed and removed from the head section, clean water is inserted into the head section.

15. The pacifier cleaning and storing apparatus of claim 9, wherein a pacifier is placed into the body section via the body section upper opening and rests upon the internal support member.

16. The pacifier cleaning and storing apparatus of claim 9, wherein an oral hygiene device is placed into the body section via the body section upper opening and rests upon the internal support member.

17. The pacifier cleaning and storing apparatus of claim 9, wherein water within the head section flows through the water inlet into the pump, and the when squeeze pressure is applied to the hat section resilient member the water is forced out of the adjustable spray nozzle and onto the pacifier.

18. The pacifier cleaning and storing apparatus of claim 9, wherein after water is sprayed onto a pacifier, the pacifier is removed from the body section by separating the head section from the body section.

* * * * *